3,096,337
PROCESS FOR THE PREPARATION OF AMINO-HALOGENOPYRIDINES
Francis Johnson, West Newton, Mass., assignor to The Dow Chemical Company, Midland, Mich., a corporation of Delaware
No Drawing. Filed Feb. 1, 1960, Ser. No. 5,661
6 Claims. (Cl. 260—296)

This invention relates to new pyridine compounds and to a method of preparing such amino-halogenopyridine compounds by means of a convenient synthetic path, commencing with a carbon compound, such, e.g., as a 1,3, dicyanopropanol-2 and substituted variants of such compounds.

2-amino-6-bromopyridine and related compounds have been prepared previously by the action of ammonia on 2,6-dibromopyridine. This material in accordance with existing practice is prepared by the bromination of pyridine at 500° C., but the process is unwieldy to the point that yields at best are a marginal 17%. Also the compounds can be made by bromination of pyridines at about 300° C. in the presence of cuprous bromide with yields of the dibromopyridine in such case being as high as 66%.

Other amino halogenopyridines are prepared in accordance with similar synthetic routes. Another recently recorded method independent of the one described in this application as a subject of this invention has to do with the use of 2-amino-6-methylpyridine for the synthesis of 2-amino-6-halogenopyridine compounds. These methods have in common the disadvantage of relying upon rare starting materials or on long awkward synthetic paths. Where the synthesis route is long, the loss incurred at one point in the route is expanded to a considerable loss of yield by virtue of the fact that low fractional yields in a series of steps causes the yield to approach zero as a limit.

Accordingly, it is an object of this invention to provide a method of synthesizing amino-halogeno-pyridine derivatives.

It is also another object of the invention to provide a method of preparing 1,3-dicyanopropanol-2 and similar compounds as precursor materials especially useful in the synthesis of the amino-halogeno-pyridine compounds.

Other objects and advantages of the invention will in part be obvious and in part appear hereinafter.

In accordance with this invention, therefore, the process is concerned with a method of preparing amino-halogenopyridine compounds from epichlorohydrin compounds and cyanides wherein the process involves, first, forming a 1,3-dicyanopropanol-2 compound from the starting material selected from the group consisting of an epichlorohydrin; a 1,3-dichloropropanol-2; a 3-hydroxy-4-chlorobutyronitrile; an epibromohydrin; a 1,3-dibromopropanol-2; or a 3-hydroxy-4-bromobutyronitrile; any glutaconitrile derivative from the 1,3-dicyanopropanol compounds by dehydration may be used or glutacononitriles where the double bond is part of aromatic ring system, any 1,3-dicyanopropene derivable from 1,3-dicyanopropanol-2 compounds by dehydration may be used: any 1,3-dicyanopropene wherein the double bond is part of an aromatic ring system may be used such as

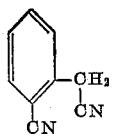

Thereafter reacting the 1,3-dicyanopropanol-2 or 1,3-dicyanopropene or glutacononitrile formed or an appropriately substituted version thereof, with an anhydrous halogen acid, either with or without the presence of a solvent, thereby produces the amino-halogenopyridine corresponding to the following:

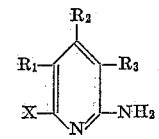

wherein $R_1$, $R_2$, $R_3$, represents any organic or inorganic radical and X represents the halogen. If it is desired to produce a compound with other than a halogen on the ring, an acid other than a halogen acid is used in the reaction.

In the reaction forming the amino-halogenopyridine, if it is desired to use a solvent the solvent must be one which does not participate in the reaction or react with the hydrogen halide used in the process.

The starting materials which include any compound having the basic structure, defined more generally, may be any compound containing the following internal structural moiety:

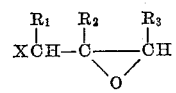

or

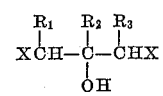

wherein X=halogen, or cyano group, which, when appropriately substituted and/or converted as follows:

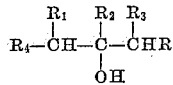

or

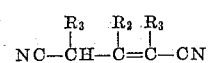

will carry in the $R_4$ and $R_5$ positions cyanide groups and in the $R_1$, $R_2$ and $R_3$ positions will carry any organic or inorganic radical except that combination wherein $R_1$ and $R_3$ are cyanide radicals. $R_1$ and $R_2$, and $R_2$—$R_3$ may be any part of an aromatic ring system. Thus raw materials for the reaction may be such organic compound and any acid HX, wherein X is a halogen. As specific examples of the starting organic compound there may be mentioned 1,3-dicyanopropanol-2, 1,3-dicyano-2- methylpropanol-2, 1,3-dicyanopropene, 1,3-dicyano-2 phenylpropanol-2, 1,3-dicyano-2 ethylpropanol-2 and compounds of the formulas

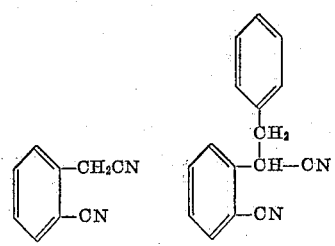

and

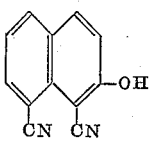

In general in carrying out the process the preferred range of temperature is from about −35° to 250° C., whereas the ratio of hydrogen halide to organic starting material should be at least 1:1.

Accordingly, it will be seen that the process is readily adaptable to the preparation of such compounds as substituted aminobromoalkylpyridines such e.g., as 2-amino-6-bromo-4-ethyl pyridine and others. In general those compounds which can be made according to the process may be represented by the following drawing:

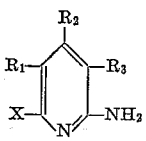

and where $R_1$ and $R_2$, and $R_2$ and $R_3$ can be part of an aromatic ring system.

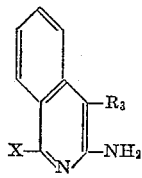

or

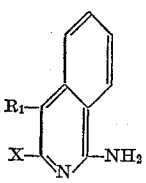

wherein the R radicals correspond to the R radicals defined in connection with the specification of starting material.

It will be seen from the general drawing of the final product of reaction that the starting material is selected to orient a substituent $R_1$, $R_2$ or $R_3$, in a desired position, because the dicyano-3 carbon nucleus moiety used for the formation of a material is traceable in the product of reaction by noting that the heterocyclic nitrogen atom in the pyridine ring is one of the nitrogens of the starting material and the nitrogen atom in the amino group is the other nitrogen atom of the starting dicyano compound.

Reference to the following specific examples will more clearly illustrate the fundamental reaction involved in the formation of the compounds:

*Example I.—Preparation of 2-Amino-6-Bromopyridine*

1,3-dicyanopropanol-2 (1 part) was added to a mixture of ether (10 parts) and methylene chloride (20 parts). Hydrogen bromide gas (anhydrous) was passed through the solution and a solid material quickly precipitated. Magnetic stirring was maintained during the introduction of the gas. When the solvent was saturated with hydrogen bromide, the flask was stoppered and the mixture allowed to stand overnight. The contents of the flask were poured into sodium hydrogen carbonate solution (saturated; about 100 parts) and methylene chloride (30 parts) added. The organic layer was separated, washed with water and dried. Removal of the solvent gave a pale brown crystalline solid which was recrystallized from methylene chloride-petrol ether (charcoal decolorization). This yielded 2-amino-6-bromopyridine (1 part) M.P. 89–90°. *Analysis.*—Calcd. for $C_5H_5N_2Br$: C, 34.68; H, 2.89; Br, 46.24; N, 16.2. Found: C, 34.8; H, 3.0; Br, 46.1; N, 16.1%. Other 2-amino-6-halogenopyridines are prepared similarly. Another recently reported method, unrelated to the one described in this patent application, relies on the use of 2-amino-6-methylpyridine for the synthesis of 2-amino-6-halogenopyridine materials. These methods suffer from the disadvantages of limited availability of starting materials, or long unwieldy synthetic paths. The present invention differs from the known art in being an entirely new method whereby one can synthesize a pyridine derivative. It also has the advantage over the known art that 2-amino-halogenopyridines previously available by multi-step procedure, can now be prepared efficiently by a one-step method starting with 1,3-dicyanopropanol-2 and its analogs.

*Example II.—The Preparation of 2-Amino-6-Iodopyridine*

1,3-dicyanopropanol-2 (1 part) was added to anhydrous ether (30 parts). Dry hydrogen iodide was then bubbled through the biphasic liquid for 1 hour until the ethereal solution was saturated. The flask was then stoppered and allowed to stand overnight. The reaction mixture was then poured into sodium hydrogen carbonate solution (saturated; 100 parts) containing a little sodium thiosulfate. This aqueous material was then extracted with methylene chloride and the organic layer separated and dried. Removal of the methylene chloride gave a mass of dark crystals. Crystallization (charcoal decolorization) of this material from acetone yielded a crop of light tan-colored crystals (1.4 parts). Further recrystallization of this material from ether-petrol ether, gave the analytically pure 2-amino-6-iodopyridine, M.P. 109–110°. *Analysis.*—Calcd. for $C_5H_5N_2I$: C, 27.30; H, 2.30; N, 12.74; I, 57.69. Found: C, 27.30; H, 2.40; N, 12.60; I, 57.50%.

*Example III.—The Preparation of 2-Amino-4-Methyl-6-Bromopyridine*

1,3-dicyano-2-methylpropanol-2 (1 part) was added to ether (5 parts). Anhydrous hydrogen bromide was bubbled through the biphasic liquid and after ten minutes the solution became homogeneous. Passage of the gas was continued for an additional half hour. The contents of the flask were then poured into a saturated solution of sodium hydrogen carbonate (50 parts). The white crystalline precipitate of 2-amino-4-methyl-6-bromopyridine (1.32 parts) was removed by filtration and air-dried, M.P. 115°. Further recrystallization of this product from water or from ether-petrol ether, did not effect any improvement in the melting point. *Analysis.*—Calcd. for $C_6H_7N_2Br$: C, 38.53; H, 3.77; N, 14.96. Found: C, 38.4; H, 3.8; N, 14.9.

What is claimed is:
1. A process for the preparation of a compound of the formula

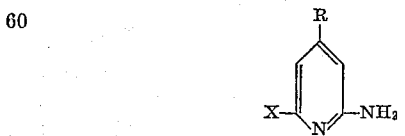

wherein R is a member selected from the group consisting of hydrogen, lower alkyl and phenyl and X is a halogen atom selected from the group consisting of bromine and iodine, which process comprises reacting in an inert organic solvent at room temperature a compound selected from the group consisting of

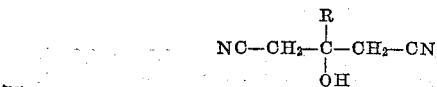

where R has the same meaning as above and the corresponding unsaturated compound formed upon splitting out of water with an anhydrous hydrogen halide of the formula HX where X has the same meaning as above and recovering said first-named compound.

2. The method in accordance with claim 1 in which the starting material is 1,3-dicyanopropanol-2.

3. The method in accordance with claim 1 in which the starting material is 1,3-dicyano-2-methylpropanol-2.

4. The method in accordance with claim 1 in which the starting material is

NCCH₂CH=CHCN

5. The method in accordance with claim 1 in which the starting material is

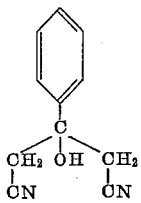

6. The method in accordance with claim 1 in which the starting material is

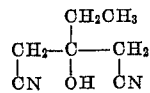

References Cited in the file of this patent

Sell et al.: J. Chem. Soc., vol. 73, pp. 777–780 (1898).
Sell et al.: J. Chem. Soc., vol. 77, pp. 771–774 (1900).
Sell et al.: J. Chem. Soc., vol. 77, pp. 233–235 (1900).
Lochte et al.: J. Am. Chem. Soc., vol. 76, pp. 5548–5551 (1954).
Maier-Bode: "Pyridine and its Deriv.," p. 143 (1934).
Klingsberg: "Pyridine and its Deriv.," (Part I), pp. 292–299, 342–3 (1960).